Patented Sept. 17, 1935

2,014,421

UNITED STATES PATENT OFFICE 2,014,421

ACCELERATOR FOR THE VULCANIZATION OF RUBBER

William Baird, Blackley, England, assignor to Imperial Chemical Industries Limited, a corporation of Great Britain No Drawing. Application March 15, 1934, Serial No. 715,781. In Great Britain March 15, 1933

10 Claims. (Cl. 18—53)

This invention relates to the vulcanization of rubber and, more particularly, to a new class of chemical compounds which are effective accelerators for the vulcanization of rubber.

It is well known that mercaptobenzthiazole and many of its homologues and derivatives form valuable accelerators for the vulcanization of rubber. The homologues and derivatives of mercaptobenzthiazole are of varying degrees of activity. Most of them are somewhat less active than mercaptobenzthiazole itself.

An object of the present invention is to provide a new class of accelerators for the vulcanization of rubber. A further object is to improve the vulcanization of rubber. Another object is to provide a class of new chemical compounds which are useful as accelerators for the vulcanization of rubber. Still another object is to provide a method for preparing such new chemical compounds. Still further objects are to provide new compositions of matter and to advance the art. Other objects will appear hereinafter.

These objects may be accomplished in accordance with my invention which comprises effecting interaction between a quaternary ammonium halide and a metallic derivative of a mercapto-arylene-thiazole, such as mercaptobenzthiazole, whereby new chemical compounds are produced which are effective accelerators for the vulcanization of rubber. Preferably the reaction is caused to take place in a medium in which at least one of the reactants is soluble and at least one of the products of the reaction is insoluble.

Suitable quaternary ammonium salts include the alkyl- and aralkyl-pyridinium halides, aralkyltrialkylammonium halides and tetra-alkylammonium halides in which one of the alkyl groups contains more than one carbon atom. The alkyl and aralkyl pyridinium halides may be represented by the formula:

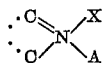

wherein X represents a halogen, A represents an alkyl or aralkyl group such as methyl, ethyl, propyl, hexadecyl, benzyl and the like and the group

represents a pyridine nucleus. The group

will include such compounds as pyridine, picoline, quinoline, isoquinoline, collidenes and lutidenes. The aralkyltrialkylammonium halides and tetra-alkylammonium halides may be represented by the formula:

wherein X represents a halogen, A' represents an alkyl group of at least 2 carbon atoms or an aralkyl group and $A_1$, $A_2$ and $A_3$ represent alkyl groups which may be the same or different.

I have found that, when such quaternary ammonium halides are reacted with a metallic derivative of a mercapto-arylene-thiazole such as the sodium salt of mercaptobenzthiazole, the halogen is replaced by the thiazole group to form compounds which may be represented by the general formula:

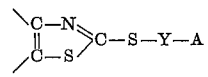

wherein A represents an alkyl or aralkyl radical and Y represents a pyridine nucleus or a trialkyl ammonium nucleus. When Y represents a pyridine nucleus, the compounds will have the general formula:

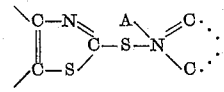

wherein A represents an alkyl or aralkyl group and the group

represents a pyridine nucleus. When Y represents a trialkyl ammonium group, the compounds may be represented by the formula:

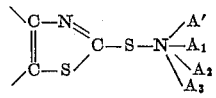

wherein A' represents an alkyl group of at least 2 carbon atoms or an aralkyl group and $A_1$, $A_2$ and $A_3$ represent alkyl groups.

Among the compounds which I have found to be particularly valuable as accelerators for the vulcanization of rubber are hexadecylpyridinium 2-benzthiazyl sulphide, hexadecyltrimethyl ammonium 2-benzthiazyl sulphide, benzyltrimethylammonium 2-benzthiazyl sulphide, 2':3'-dihydroxypropylpyridinium - 2 - benzthiazyl sulphide, benzylpyridinium 2-benzthiazyl sulphide and B-hydroxyethylpyridinium 2-benzthiazyl sulphide.

In order to more clearly illustrate my invention and the preferred modes of carrying the same into effect the following examples are given:

*Example 1*

3.84 parts of the quaternary salt derived from hexadecylbromide and pyridine are dissolved in 50 parts of hot benzene. 1.9 parts of the sodium salt of 2-mercaptobenzthiazole are added to the solution. After refluxing for 3½ hours, the solution is filtered. The filtrate, on cooling, deposits yellow glistening leaves of hexadecylpyridinium 2-benzthiazyl sulphide, M. P. 102–105° C.

*Example 2*

A preparation similar to the above is made by using hexadecyltrimethylammonium bromide in place of hexadecylpyridinium bromide. This gives hexadecyltrimethylammonium-2-benzthiazyl sulphide which is fairly soluble in benzene. This substance forms white leaflets, M. P. 120–130° C., from aqueous acetone.

*Example 3*

10 parts of benzyltrimethylammonium chloride are dissolved in a mixture of 50 parts of methyl alcohol and 50 parts of benzene and the solution refluxed with 10 parts of the sodium salt of 2-mercaptobenzthiazole for 1 hour and filtered. An oily residue is obtained on removing the solvent. This residue, on stirring with water, becomes solid. Recrystallization from benzene-acetone gives yellow leaflets, M. P. 85–86° C.

*Example 4*

5.2 parts of the quaternary ammonium salt, derived from glycerole chlorohydrin and pyridine, are dissolved in 50 parts of methyl alcohol and the solution refluxed with 4.75 parts of the sodium salt of 2-mercaptobenzthiazole for 1 hour. The solution is filtered and the solvent distilled off, leaving a viscous oil. This oil crystallized from a benzene-alcohol mixture giving 2':3'-dihydroxypropylpyridinium - 2 - benzthiazyl sulphide, M. P. 104–107° C. This substance is easily soluble in water.

*Example 5*

20 parts of benzylpyridinium chloride are dissolved in 100 parts of water and added, with stirring, to a solution of 19 parts of the sodium salt of mercaptobenzthiazole in 100 parts of water. An oil commences to separate immediately. After stirring for 12 minutes, the stirring is discontinued and the oil separated by mechanical means. The product, benzylpyridinium benzthiazyl sulphide, is a pale reddish colored mobile oil.

*Example 6*

8 parts of B-hydroxyethylpyridinium chloride and 9.5 parts of the sodium salt of mercaptobenzthiazole are dissolved in 25 parts of methyl alcohol. The solution is boiled under a reflux condenser for 2 hours, filtered and the solvent removed from the filtrate under reduced pressure. The product, B-hydroxyethylpyridinium benzthiazyl sulphide, is a brownish viscous oil which is soluble in water.

The compounds of my invention were tested as accelerators in a mix of the following composition, in which the parts are by weight:

| | |
|---|---|
| Pale crepe | 100 |
| Zinc oxide | 10 |
| Blanc fixe | 75 |
| Stearic acid | 1 |
| Sulphur | 2.5 |
| Accelerator | 0.5 |

The resulting mixes were vulcanized for various periods of time and at various temperatures. The results are given in the following table in which A is hexadecyltrimethylammonium 2-benzthiazole sulphide; B is hexadecylpyridinium 2-benzthiazole sulphide; C is benzylpyridinium 2-benzthiazyl sulphide; D is benzyltrimethylammonium 2-benzthiazyl sulphide and E is 2-mercaptobenzthiazole.

| Time of cure | Temperature of cure | Tensile strength in kgs/sq. cm. | | | | |
|---|---|---|---|---|---|---|
| | | A | B | C | D | E |
| *Minutes* | ° *C.* | | | | | |
| 5 | 141 | 198 | 158 | 168 | 210 | 42 |
| 10 | 141 | 254 | 225 | 216 | 244 | 129 |
| 15 | 141 | 255 | 236 | 232 | 244 | 160 |
| 20 | 141 | 245 | 233 | 222 | 243 | 184 |
| 30 | 141 | 224 | 231 | 217 | 229 | 187 |
| 45 | 141 | 217 | 214 | 208 | 230 | 197 |
| 50 | 110 | 179 | ---- | ---- | 215 | 22 |
| 75 | 110 | 234 | 210 | 229 | 239 | 103 |

From the above tests it will be apparent that the compounds of my invention are much more active accelerators than mercaptobenzthiazole itself.

While, in the above examples and tests, certain derivatives of mercaptobenzthiazole have been prepared and disclosed, like derivatives of other mercaptoarylene thiazoles may be similarly prepared and will be found to be effective accelerators of the vulcanization of rubber. Other mercaptoarylene thiazoles, which may be substituted for mercaptobenzthiazole in the preparation of such derivatives which will be found to be effective accelerators, are 2-mercapto N-alpha naphtho thiazole, the dimercapto dithiazole prepared from benzidine and 4-6-dimethyl benzothiazole.

While I have disclosed the preferred embodiments of my invention, it will be readily apparent to those skilled in the art that many variations and modifications may be made therein and in the methods of preparing the new compounds and compositions without departing from the spirit of my invention. Accordingly, the scope of my invention is to be limited solely by the appended claims construed as broadly as is permissible in view of the prior art.

I claim:

1. The method of vulcanizing rubber which comprises incorporating in a rubber mix, prior to vulcanization, a small amount of a compound having the formula:

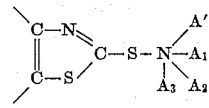

wherein the group

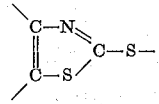

represents a mercapto arylene thiazole radical, A' represents an alkyl group of at least two carbon atoms or an aralkyl group and $A_1$, $A_2$ and $A_3$ represent alkyl groups.

2. Rubber having incorporated therein, as a vulcanization accelerator, a compound having the formula:

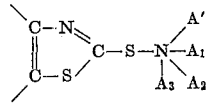

wherein the group

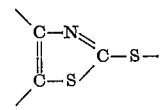

represents a mercapto arylene thiazole radical, A' represents an alkyl group of at least two carbon atoms or an aralkyl group and $A_1$, $A_2$ and $A_3$ represent alkyl groups.

3. The method of vulcanizing rubber which comprises incorporating in a rubber mix, prior to vulcanization, a small amount of a compound having the formula

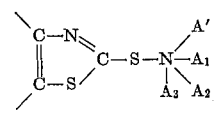

wherein the group

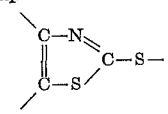

represents a mercaptoarylene thiazole radical, A' represents a benzyl radical, and $A_1$, $A_2$ and $A_3$ represent methyl radicals.

4. The method of vulcanizing rubber which comprises incorporating in a rubber mix, prior to vulcanization, a small amount of a compound having the formula

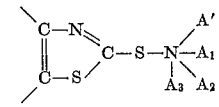

wherein the group

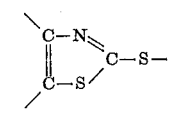

represents a mercaptobenzo thiazole radical, A' represents an alkyl group of at least two carbon atoms or an aralkyl group, and $A_1$, $A_2$, and $A_3$ represent alkyl groups.

5. The method of vulcanizing rubber which comprises incorporating in a rubber mix, prior to vulcanization, a small amount of a compound having the formula

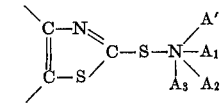

wherein the group

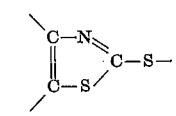

represents a mercaptobenzo thiazole radical, A' represents a benzyl radical, and $A_1$, $A_2$ and $A_3$ represent methyl radicals.

6. The method of vulcanizing rubber which comprises incorporating in a rubber mix, prior to vulcanization, a small amount of benzyltrimethylammonium benzthiazyl sulphide.

7. Rubber having incorporated therein, as a vulcanization accelerator, a compound having the formula

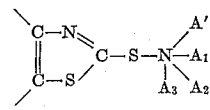

wherein the group

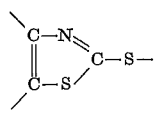

represents a mercaptoarylene thiazole radical, A' represents a benzyl radical, and $A_1$, $A_2$ and $A_3$ represent methyl radicals.

8. Rubber having incorporated therein, as a vulcanization accelerator, a compound having the formula

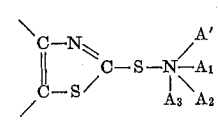

wherein the group

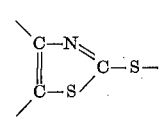

represents a mercaptobenzo thiazole radical, A' represents an alkyl group of at least two carbon atoms or an aralkyl group, and $A_1$, $A_2$, and $A_3$ represent alkyl groups.

9. Rubber having incorporated therein, as a vulcanization accelerator, a compound having the formula

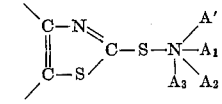

wherein the group

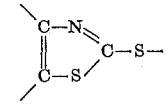

represents a mercaptobenzo thiazole radical, A' represents a benzyl radical, and $A_1$, $A_2$ and $A_3$ represent methyl radicals.

10. Rubber having incorporated therein, as a vulcanization accelerator, benzyltrimethylammonium benzthiazyl sulphide.

WILLIAM BAIRD.